(No Model.)
E. BRADT.
RASPING TOOL.
No. 372,594. Patented Nov. 1, 1887.
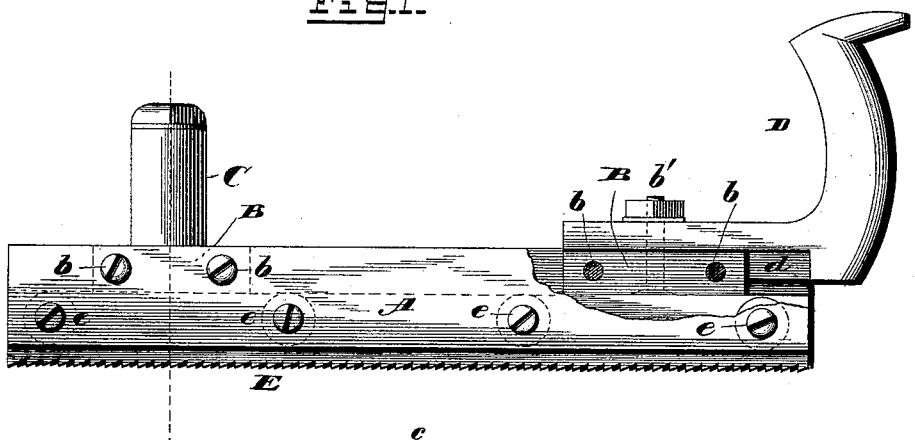
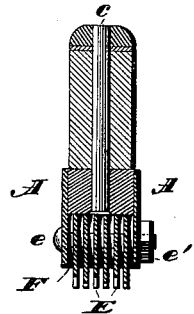
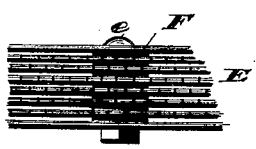
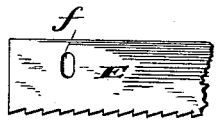
WITNESSES
G. S. Elliott,
E. W. Johnson
Emenzo Bradt.
INVENTOR
Attorney

UNITED STATES PATENT OFFICE.

EMENZO BRADT, OF JOHNSTOWN, NEW YORK.

RASPING-TOOL.

SPECIFICATION forming part of Letters Patent No. 372,594, dated November 1, 1887.

Application filed April 28, 1887. Serial No. 236,479. (No model.)

*To all whom it may concern:*

Be it known that I, EMENZO BRADT, a citizen of the United States of America, residing at Johnstown, in the county of Fulton and State of New York, have invented certain new and useful Improvements in Machines for Leveling Cutting-Blocks; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in tools or implements for leveling chopping-blocks or cutting-boards; and my invention consists of a tool having on its upper part hand-grasping portions or handles which are rigidly attached to a frame, said frame carrying a series of blades, the lower edges of which have teeth formed thereon, as will be hereinafter fully set forth, and specifically pointed out in the claims.

In the accompanying drawings, which illustrate my invention, Figure 1 is a side view of my improved implement, showing the rear upper portion broken away. Fig. 2 is a vertical sectional view taken through the line *x x*, Fig. 1. Fig. 3 is a detail plan view, and Fig. 4 is a side view, of one of the blades.

A A refer to the longitudinal side pieces, which are provided at suitable points with perforations for securing the parts to each other. These side pieces are held apart from each other near their upper edges by blocks B B, through which pass bolts *b b*, which pass through suitable perforations therein and through the side pieces, A. To the front block is attached a vertical handle, C, which is secured thereto by a bolt, *c*, and to the rear of the block is attached a handle, D, which is shaped similar to a plane-handle. This handle has a portion of its lower edge provided with a recess, *d*, and it is cut away at its front end portion so as to lie over the block, to which it is secured by a bolt, *b'*.

The lower edges of the side pieces, A A, are provided with corresponding perforations, through which pass bolts *e e*, said bolts being provided with suitable securing-nuts, *e'*.

The blades E are provided with perforations which register with the perforations in the side plates, these perforations being oblong, as shown at *f*, so that the blades can be adjusted vertically with respect to the side pieces, A, when worn. The lower edges of the blades are provided with teeth similar to the teeth of an ordinary saw, and when the plates are secured in position these teeth are preferably arranged so that they will not be on a transverse line with each other. Between each of the blades E are placed washers F, which will serve to hold the blades apart from each other and provide spaces through which the cuttings will pass. The blades E extend to a slight distance below the lower edge of the side pieces, A.

This device is especially useful for dressing or smoothing chopping-blocks or cutting-boards in which the grain of the wood is vertical, and by reciprocating this instrument over such chopping-blocks they may be readily leveled.

I claim—

1. In a device for smoothing or leveling chopping-blocks, a suitable frame provided with handles, said frame having attached thereto a series of parallel blades the lower edges of which are provided with teeth, substantially as shown, and for the purpose set forth.

2. In a device for leveling or smoothing chopping or cutting blocks, the combination of the side pieces, A, provided near their upper edge with blocks which are attached to the side pieces and provided with projecting handles, and a series of blades secured between the side pieces by bolts, said blades being held apart from each other by washers placed over the bolts, substantially as shown, and for the purpose set forth.

3. In a device for leveling chopping or cutting blocks, the side pieces, A, having blocks B attached near their upper edges for holding the side pieces apart and forming means for attaching handles thereto, said side pieces being provided near their lower edges with a series of perforations through which pass bolts which are provided with washers, and blades E, having oblong perforations $f$, the parts being organized substantially as shown, and for the purpose set forth.

4. The combination of the side pieces, A, having suitable projecting handles attached thereto, a series of blades, E, secured between said side pieces by bolts, said blades being held apart from each other by washers through which the securing-bolts pass, substantially as shown, and for the purpose set forth.

In testimony whereof I affix my signature in presence of two witnesses.

EMENZO BRADT.

Witnesses:
JERRY KEELER,
WM. ARGIMENGER.